INVENTOR.
LAWRENCE D. NINNEMAN
BY Philip M. Rice
& W. A. Schaich
ATTORNEYS

INVENTOR.
LAWRENCE D. NINNEMAN
BY Philip M. Rice
& W. A. Schaich
ATTORNEYS

Oct. 14, 1969      L. D. NINNEMAN      3,471,896

APPARATUS FOR FORMING PLASTIC ARTICLES

Filed Sept. 6, 1966      4 Sheets-Sheet 4

INVENTOR.
LAWRENCE D. NINNEMAN
BY Philip M. Rink
& W. A. Schaich
ATTORNEYS

United States Patent Office 3,471,896
Patented Oct. 14, 1969

3,471,896
APPARATUS FOR FORMING PLASTIC ARTICLES
Lawrence D. Ninneman, Toledo, Ohio, assignor to Owens-Illinois, Inc., a corporation of Ohio
Filed Sept. 6, 1966, Ser. No. 577,518
Int. Cl. B29f 1/022
U.S. Cl. 18—5                                                3 Claims

ABSTRACT OF THE DISCLOSURE

Apparatus is provided for injection molding a flat disc-type parison and transferring such parison to a blow mold where it is molded to the final article. A plunger is provided for urging a central portion of the parison out of contact with the molding surface during transfer of the parison from the injection molding station to the blow molding station. The molding apparatus is provided with a rim cavity defined in part by a stripper ring with a rim cavity having a reversely cut reentrant portion to retain the parison on the mold during transfer from the injection station to the blow mold station.

---

This invention relates generally to an apparatus for forming hollow plastic articles and more particularly to forming, rapidly and economically, cup-shaped containers having a precisely contoured rim portion. It is generally known to form a plastic container by a method wherein a substantially flat parison is injection molded in an injection mold cavity and is then carried by part of the injection mold to a blow mold where such parison is pressure formed into an article whose exterior surface conforms to the mold cavity. Such a process is disclosed in Canadian Patent No. 730,061, issued Mar. 15, 1966.

One of the advantages of forming articles according to the above process is that the most critical portion of the container from the standpoint of desired accuracy of contour, namely the rim portion, can be precisely formed to any desired contour and maintained to that contour throughout the remainder of the container forming operation. Under such process, the part of the injection mold used to carry the parison to the blow mold includes a plunger capable of being axially extended to mechanically depress the central portion of the parison thereby stretching the portion thereof which is to form the sidewall of the finished container. It is highly desirable that the plunger begin mechanically depressing the central portion of the parison as soon as possible after the injection mold part begins the step of transferring the parison to the blow mold. The reason for this is two-fold. In the first place, it permits the overall molding cycle to be as short as possible. Secondly, it permits a major portion of the hot thermoplastic material having a low coefficient of thermal conductivity to be moved out of contact with the metal molding surface having a high coefficient of thermal conductivity. Such disengagement of the thermoplastic material from the molding surface prevents excessive cooling of the parison.

Difficulties have been encountered in that the extension of the plunger to stretch the parison tends to push the parison off of the injection mold part carrying it.

Accordingly, it is an object of the present invention to provide an apparatus for forming plastic articles by an injection molded parison-plunger assisted blow molding method characterized by the capability of extending the plunger to mechanically depress the central portion of the parison without pushing the parison off of the injection mold part carrying it even though such parison is not, at that time, clamped to the blow mold.

Under the present invention, it is contemplated to form the rim portion of the injection molded parison in a re-entrant cavity to insure that the injection molded parison is securely retained on one part or half of the injection mold while being carried from the other part of the injection mold to the blow mold. Such re-entrant rim cavity is defined between a central block portion and a stripper ring portion of the injection mold half. This construction permits the finished container to be positively ejected from the mold without deforming or otherwise damaging the rim and yet insures that the injection molded parison will not inadvertently drop off of the injection mold part carrying such parison. Furthermore, as previously noted, it permits the central portion of the parison blank to be displaced away from the molding surface prior to clamping such parison mold portion to the blow mold.

It is an additional object of the present invention to provide apparatus for forming plastic containers having accurately formed rim portions.

It is a further object of the present invention to provide apparatus for securely retaining a parison solely by the rim portion and yet which will permit the finished container to be ejected therefrom without deforming such rim portion.

Other objects and advantages of the present invention will become readily apparent from the following detailed description taken in conjunction with the annexed sheets of drawings on which:

Figure 1:
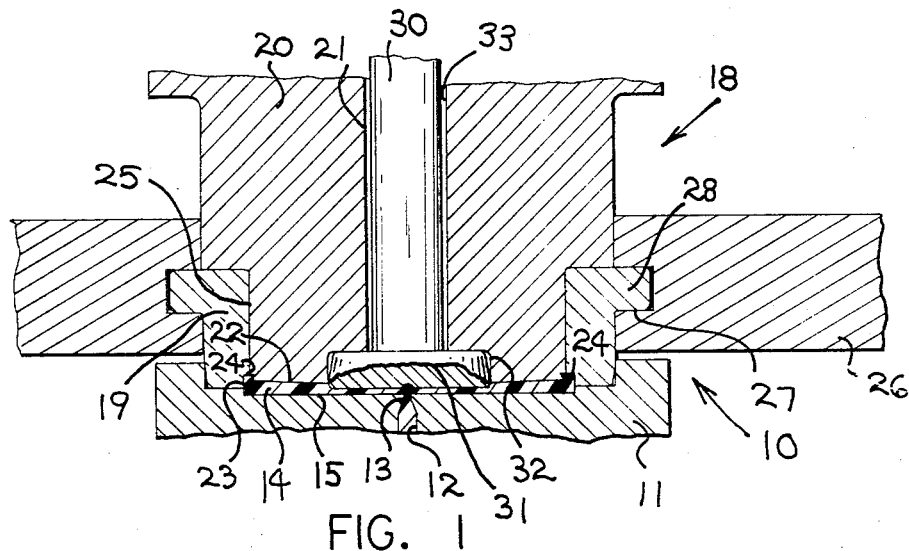
FIGURE 1 is a vertical, sectional view, somewhat schematic in character illustrating one form of apparatus for carrying out the initial parison injection molding step according to the present invention.

Referring now to the drawings, there is provided an injection mold generally designated by the numeral 10 comprising a lower injection block 11 having a supply channel 12 therein adapted to receive plasticized thermoplastic material from a suitable source, as from a conventional plasticizer-extruder. The supply channel 12 terminates in an upper reduced orifice 13 from which the plasticized material flows into an injection mold cavity 14. The injection mold cavity 14 is defined between the upper planar surface 15 of the block 11 and an upper injection mold assembly indicated generally by the numeral 18.

The upper injection mold assembly 18 includes ring element 19 which is annular in shape and which receives therein a central mold element 20 having an internal bore 21. The central mold element 20 terminates at its lower end in a parison sidewall molding surface 22 which is frusto-conical in shape and which cooperates with the upper planar surface 15 of the lower injection block 11 to define a gap which is relatively thin near the central axis and thicker toward the periphery. The central mold element 20 is snugly but slidably received in the ring element 19, with a sidewall portion 25 of the central mold element 20 contacting the ring element 19. The central mold element 20 has at its lower corner a notch defined by an outwardly facing wall portion 16 and downwardly facing wall portion 17. The ring element 19 has a notch at the inner corner facing the lower injection block 11. The notch is defined by an inwardly facing wall portion 23 and a downwardly facing wall portion 24 which cooperate with the wall portions 16 and 17 of the central mold 20 to define the rim cavity portion of the injection mold cavity 14. As can be seen from the drawings, the outwardly facing wall portion 16 tapers toward the central axis in an upwardly direction. Such taper results in a re-entrant rim cavity which provides a rim portion thicker at the upper or free end than at the lower end joining the rim portion to the rest of the injection mold cavity 14.

Movement of the ring element 19 relative to the central mold element 20 is effected by means of a carrying member 26 having a groove 27 in which a radially outwardly projecting flange 28 of ring element 19 is received. Any desired power means may be utilized for moving the carrying member 26 and, thus, the ring element 19 axially with respect to the central mold element 20. It may be readily appreciated that movement of the ring element 19 downwardly with respect to the central mold element 20 will serve to strip or eject therefrom an article which is supported in the re-entrant or reverse tapered rim portion of the mold cavity 14.

Positioned in the bore 21 of the central mold element 20 is a vertically reciprocable piston rod 30 carrying on the free end thereof a circular disc-like element or plunger 31. When retracted, as during the injection molding step illustrated in FIGURE 1, the plunger 31 is positioned in a recess 32 formed in the lower end of the central mold element 20. The lower face of the plunger 31 cooperates with the upper planar surface 15 to define the center portion of the parison which will be the bottom of the finished container.

Figure 4:
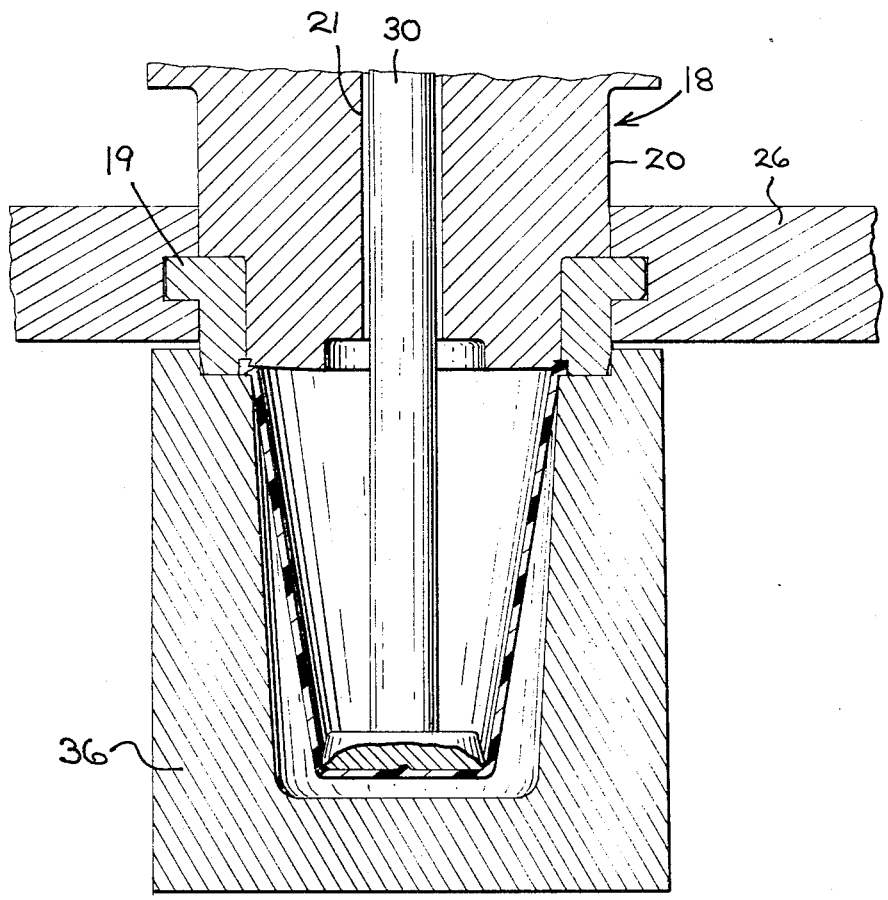
FIGURE 4 is a view similar to FIGURE 3 illustrating a subsequent step wherein the parison is clamped to a blow mold.
Figure 5:
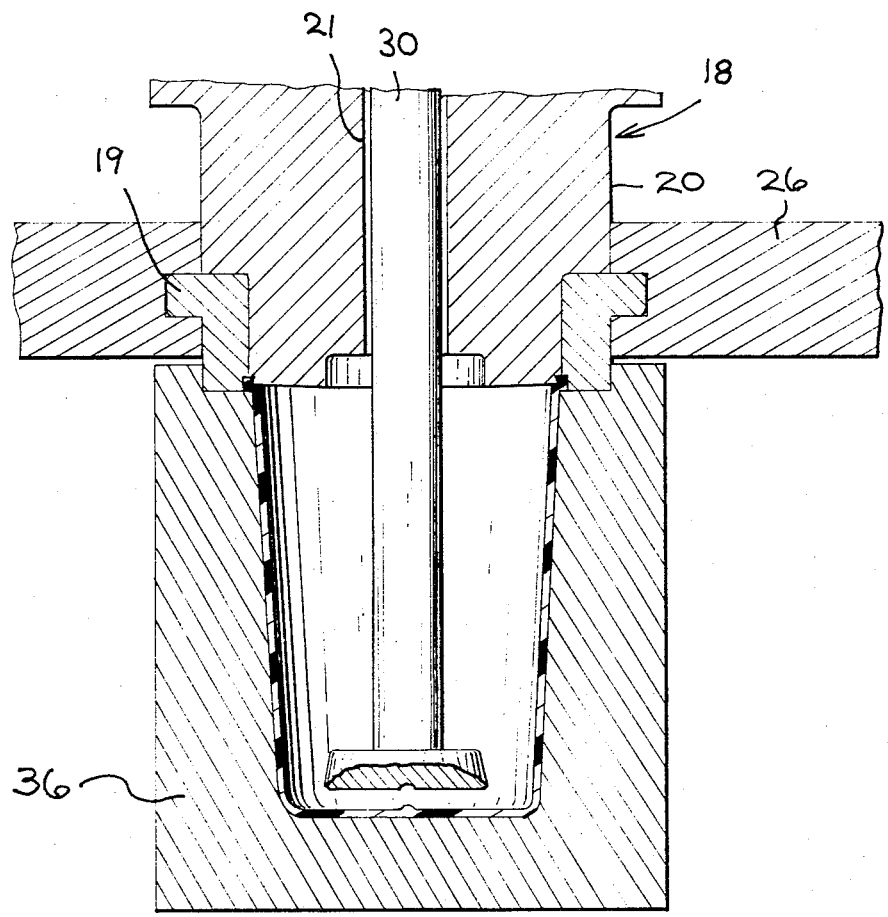
FIGURE 5 is a view similar to FIGURE 4 but illustrating the blow molding of the container.

The piston rod 30 is spaced from the wall of the bore 21 to provide an annular passageway 33 through which pressured fluid may be introduced to expand the stretched parison into conformity with the molding cavity of a blow mold 36 (see FIGURES 4 and 5).

In operation, the upper mold assembly 18 is positioned against the lower injection block 11 and heated thermoplastic material is injection molded in the cavity 14 through the supply channel 12.

Figure 2:
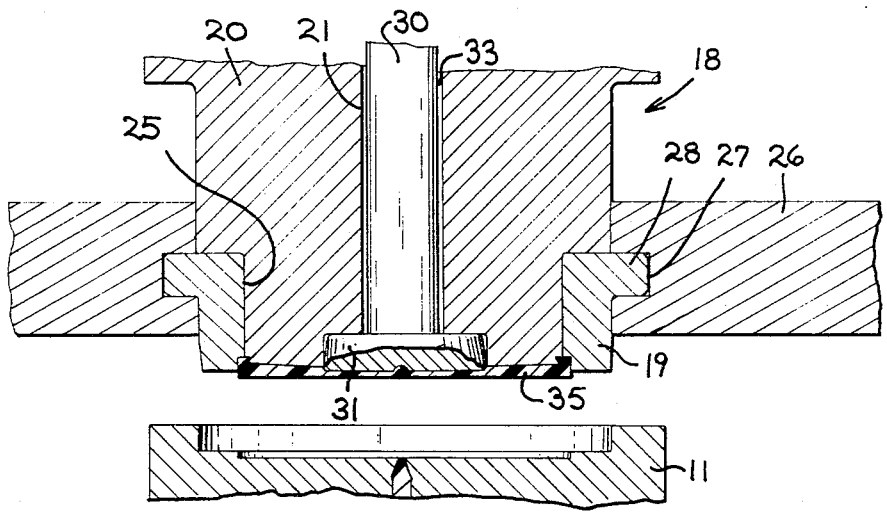
FIGURE 2 is a view similar to FIGURE 1 illustrating a subsequent step wherein one-half of the injection mold lifts the parison out of contact with the other half of the injection mold preparatory to transferring such parison to a blow mold.

The injection molding step results in the plasticized material completely filling the cavity including the rim defining portion thereof to form a substantially flat disc-like parison 35. Thereafter, the upper mold assembly 18 is lifted by any desired power means from the lower injection block 11 (FIGURE 2) and transferred to the blow mold 36. The upper mold assembly 18 carries with it the injection molded parison 35 which is held thereon by virtue of the rim portion engaged in the re-entrant rim cavity.

Figure 3:
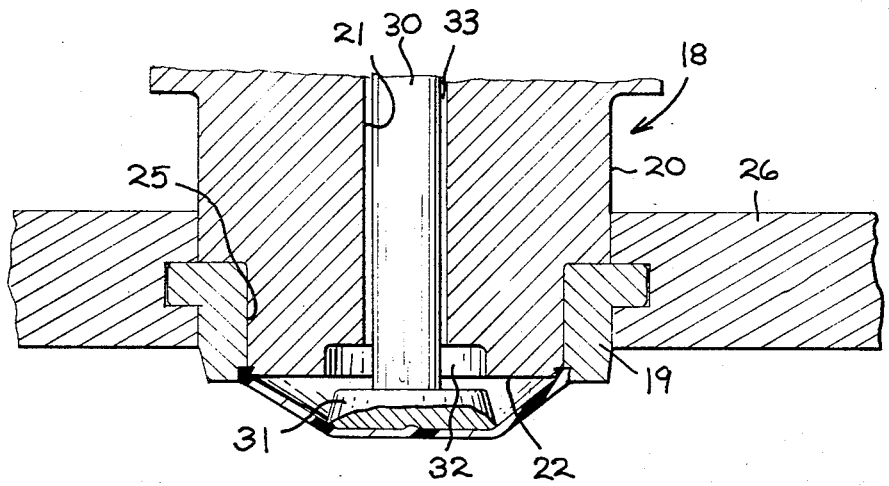
FIGURE 3 is a view similar to FIGURE 2 illustrating partial extension of the plunger to move the sidewall forming portion of the parison out of contact with the mold surface during movement to the blow mold.

Upon disengagement of the upper mold assembly from the lower injection block 11, the plunger 31 is partially extended to urge the parison 35 out of contact with the molding surface 22 (FIGURE 3). It will be readily apparent that the extension of the plunger will have a tendency to push the parison off of the upper mold assembly 18. However, the reverse taper providing the re-entrant rim cavity insures that the parison is retained on such upper mold assembly.

Figure 6:
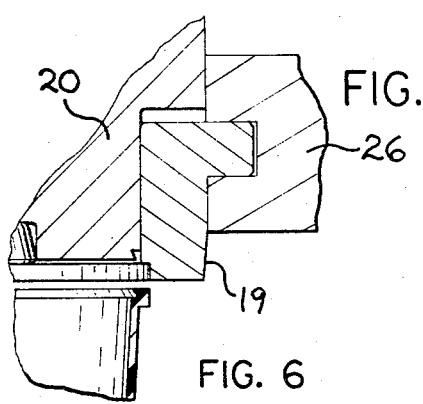
FIGURE 6 is an enlarged fragmentary view showing the finished container after removal from the blow mold while it is being stripped or ejected from the injection mold half carrying it.

Thereafter, as illustrated in FIGURES 4 and 5, the upper mold assembly 18 carrying the partially deformed parison is positioned on the blow mold 36 and pressured fluid introduced through the passageway 33 to expand the parison into conformity with the cavity of the blow mold. Upon completion of the blowing step, the upper mold assembly 18 is raised to remove the container from the blow mold. The carrying member 26 is then urged downwardly (FIGURE 6) carrying the ring element 19 therewith, moving it relative to the central mold element 20 to strip or eject the formed container therefrom.

Figure 1A:
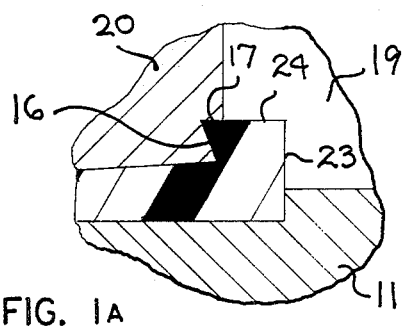
FIGURE 1A is an enlarged fragmentary view of a portion of the apparatus shown in FIGURE 1.
Figure 1B:
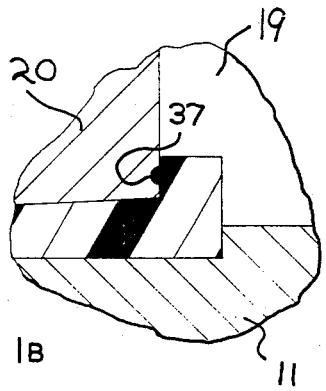
FIGURE 1B, 1C and 1D are views similar to FIGURE 1A showing modified embodiments.
Figure 1C:
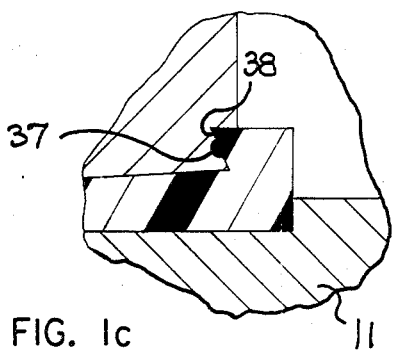
Figure 1D:
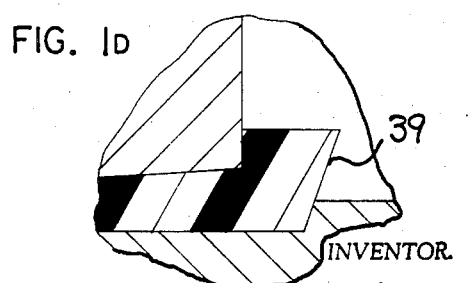

FIGURES 1B, 1C and 1D illustrate modified embodiments in which the rim cavities are provided with different configurations of re-entrant portions. Thus, in the apparatus illustrated in FIGURE 1B, the central mold element is formed with a small annular groove 37 in the area which defines a part of the rim cavity. The embodiment illustrated in FIGURE 1C provides both a reverse taper 38 and an annular groove 37 while the embodiment illustrated in FIGURE 1D provides a reverse taper 39 on the stripper ring 26 rather than on the central mold element 20.

The precise embodiment preferred for a given operation will be dependent in large measure on the type of thermoplastic material being molded. Thus, the simple reverse taper of FIGURES 1A and 1D may be well suited for molding a rigid plastic such as polystyrene while the groove of FIGURE 1B or the combined reverse taper and groove of FIGURE 1C may be required for molding a highly flexible plastic such as low density polyethylene.

It will be readily seen from the foregoing that the present invention provides apparatus capable of forming containers much more economically and with a much more precisely formed rim portion than was heretofore possible.

By securely holding the injection molded parison on one half of the injection mold, it is possible to extend the plunger soon after the step of transporting the parison to the blow mold begins. Furthermore, the action of the stripper ring in positively ejecting the finished containers prevents warping of the rim as a result of such step.

Numerous modifications will become readily apparent to those skilled in the art. Accordingly, the true scope of the invention is defined in the following claims.

I claim:

1. Apparatus for forming plastic containers having rim portions comprising an injection mold back and an injection mold front cooperating to define a mold cavity, means for introducing plasticized material into said cavity, said mold back defining completely therein a rim cavity communicating with said mold cavity, said mold back including
   (a) a central mold element having an axial passageway formed therein,
   (b) a plunger positioned in said passageway, means for axially moving said plunger,
   (c) an annular ring snugly encircling said central mold element, said annular ring having a notch at the inner corner facing said mold front, said notch forming at least a part of said rim cavity and being formed with a reversely cut portion to provide a re-entrant rim cavity, and
   (d) means for moving said ring axially with respect to said central mold element.

2. Apparatus as defined in claim 1 wherein said central mold element has a notch at the outer corner facing said ring and said mold front.

3. Apparatus for forming plastic containers comprising an injection mold back and an injection mold front cooperating to define a mold cavity, means for introducing thermoplastic material into said cavity, and an open ended blow mold having a cavity contoured to the desired external configuration of the major portion of the article to be formed and adapted to receive said injection mold back and parison carried thereby, said mold back including
   (a) a central mold element having an axial passageway formed therein,
   (b) a plunger positioned in said passageway, means for axially moving said plunger, (c) an annular ring snugly encircling said central mold element, said annular ring having a notch at the inner corner facing said mold front, said notch forming at least a part of said rim cavity, and (d) at least one of the elements defining said rim cavity being formed with a reversely cut portion to provide a reentrant rim cavity, means for moving said mold back from said mold front to said blow mold while an injection molded parison is carried thereby, means for axially extending said plunger to stretch said parison during movement of said mold back to blow mold, said parison being retained on said mold back by means of said reentrant cavity, means for introducing pressured fluid into said stretched parison to expand it into conformity with said mold cavity, means for removing said molded article from said cavity and means for moving said ring axially with respect to said central mold element to eject the finished container from said mold back.

References Cited

UNITED STATES PATENTS

| 3,300,559 | 1/1967 | Baehr | 264—323 |
|---|---|---|---|
| 3,305,158 | 2/1967 | Whiteford. | |
| 3,324,509 | 6/1967 | Hey et al. | |
| 3,341,644 | 9/1967 | Allen. | |

FOREIGN PATENTS 274,084  5/1963  Australia.

WILBUR L. McBAY, Primary Examiner

U.S. Cl. X.R.

18—19; 264—97